US012806894B2

(12) United States Patent
Argaman et al.

(10) Patent No.: US 12,806,894 B2
(45) Date of Patent: Nov. 24, 2026

(54) METHOD OF MANUFACTURING A SMARTCARD INCLUDING A METAL LAYER HAVING A RECESSED PORTION

(71) Applicant: IDEMIA France, Courbevoie (FR)

(72) Inventors: Shay Argaman, Courbevoie (FR); Michael Reed, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 545 days.

(21) Appl. No.: 18/211,334

(22) Filed: Jun. 19, 2023

(65) Prior Publication Data

US 2024/0416639 A1 Dec. 19, 2024

(51) Int. Cl.

| | |
|---|---|
| ***B32B 38/10*** | (2006.01) |
| ***B32B 3/30*** | (2006.01) |
| ***B32B 7/12*** | (2006.01) |
| ***B32B 15/04*** | (2006.01) |
| *B29C 70/68* | (2006.01) |

(52) U.S. Cl.

CPC ................ *B32B 38/10* (2013.01); *B32B 3/30* (2013.01); *B32B 7/12* (2013.01); *B32B 15/04* (2013.01); *B29C 70/686* (2013.01); *B32B 2250/03* (2013.01); *B32B 2250/40* (2013.01); *B32B 2255/06* (2013.01); *B32B 2255/26* (2013.01); *B32B 2307/538* (2013.01); *B32B 2307/7376* (2023.05); *B32B 2425/00* (2013.01)

(58) Field of Classification Search

CPC ............................ B29C 70/685; B29C 70/686

See application file for complete search history.

(56) References Cited

U.S. PATENT DOCUMENTS

| | | | | |
|---|---|---|---|---|
| 8,672,232 B2 * | 3/2014 | Herslow | ................ G06K 19/02 | 235/487 |
| 9,569,718 B2 | 2/2017 | Herslow | | |
| 10,255,539 B2 | 4/2019 | Cox | | |
| 10,583,683 B1 * | 3/2020 | Ridenour | .............. B42D 25/23 | |
| 11,501,128 B2 | 11/2022 | Lowe | | |
| 11,650,570 B2 | 5/2023 | Cox | | |
| 2011/0076452 A1 * | 3/2011 | Sakagami | ............... B32B 27/36 | 428/141 |
| 2011/0123766 A1 * | 5/2011 | Sakagami | ............. B32B 27/285 | 428/141 |
| 2023/0086189 A1 | 3/2023 | Finn et al. | | |

FOREIGN PATENT DOCUMENTS

WO 2020166754 A1 8/2020

OTHER PUBLICATIONS

International Search Report and Written Opinion of the International Searching Authority, issued in International Patent Application No. PCT/EP2024/064160 dated Aug. 22, 2024.
English language abstract of WO2020166754.

* cited by examiner

*Primary Examiner* — Emmanuel S Luk
(74) *Attorney, Agent, or Firm* — NIXON & VANDERHYE

(57) ABSTRACT

A method of manufacturing a smartcard comprising a metal layer, the method comprising providing a metal layer having a surface including a recessed portion and laminating the metal layer with an outer layer arranged above the recessed portion and a resin layer arranged between the outer layer and the metal layer and within the recessed portion.

12 Claims, 2 Drawing Sheets

METHOD OF MANUFACTURING A SMARTCARD INCLUDING A METAL LAYER HAVING A RECESSED PORTION

FIELD

The invention relates generally to the field of smartcards, and in particular smartcard comprising a metal layer and their methods of manufacturing.

BACKGROUND

Smartcards may include a metal layer laminated between other layers such as polymer layers.

This has been proposed so as to make the smartcards more desirable to the user but poses a number of challenges. New card designs are needed.

In particular, it is usually desirable to make engravings in the metal layer of a smartcard so that a pattern can be observed on the smartcard. The obtained results are not satisfactory in terms of appearance using the methods of the prior art.

From the prior art, the following documents are known:
U.S. Pat. No. 10,255,539 to Mark A. Cox, and
U.S. Pat. No. 11,650,570 also to Mark A. Cox, and
PCT application WO 2020166754, and
U.S. Pat. No. 11,501,128 to Lowe et al., and
U.S. Pat. No. 9,569,718 to John Herslow.

Existing solutions are often not satisfactory as they can lead to the presence of defects and cosmetically undesirable effects.

There exists a need for other manufacturing techniques for smartcards including metal layers.

BRIEF SUMMARY

The disclosure proposes a method of manufacturing a smartcard comprising a metal layer, the method comprising: providing a metal layer having a surface including a recessed portion (in other words the recessed portion recesses from the surface towards the inside of the metal layer), laminating the metal layer with an outer layer (sometimes called a top overlay, for example a stack of sub layers including ink) arranged above the recessed portion, and a resin layer arranged between the outer layer and the metal layer, and within the recessed portion (here, the recessed portion is filled with the resin layer).

Methods according to the prior art propose forming patterns in metal layers after a laminating step has been performed. The inventors of the present disclosure have observed that the tools used to form patterns (i.e. recessed portions in the form of a given pattern), typically milling tools, mill through layers that have been laminated together with the metal layers, which leads to the presence of a physical defect (burrs, metal residues, etc.) that can be felt tactilely and which may be aesthetically unpleasing.

Here, it is proposed to form the recessed portion prior to laminating the document, and to fill the recessed portion with a resin layer, the resin layer separating the metal layer from the outer layer. After laminating, the obtained smartcard may have, at the level of the outer layer, a substantially flat surface where tactilely it is not possible to detect the presence of a relief. Also, aesthetically, the resin may compensate the presence of any defect at the level of the recessed portion. The recessed portion is however discernible to the eye (for example if the outer layer and the resin layer are at least partially transparent), which is a desirable effect. Using a resin allows having higher tolerances for the processes used to create the recessed portion.

The resin material may be chosen so as to melt, for example during the laminating, into the recessed portion to obtain the substantially flat surface. The resin material may also be liquid so as to fill the recessed portion prior to the laminating.

Furthermore, forming a recessed portion only in the metal layer leads to greater results than forming a recessed portion in a stack of layers.

In particular, the above method reduces the number of smartcards considered to be defective and therefore reduces the number of defective cards thrown away. The above method avoids or covers metal manipulation related defect (roughness, burr, etc.)

Also, by encapsulating the metal layer using the resin (on the side of the surface but also eventually on the opposite side), it is possible to protect the metal layer from corrosion (when a recess is formed after laminating, the metal is exposed to the environment).

According to a particular embodiment, the method comprises a step of milling an initial metal layer so as to obtain the metal layer including the recessed portion formed by milling (i.e. mechanical milling).

This particular embodiment may be limited to the use of milling.

The disclosure is not limited to milling and may be implemented using photolithography, etching, laser milling, etc. It should however be noted that the method is particularly efficient in a context where milling is used as the resin may compensate milling defects such as burrs.

In fact, using a resin is particularly suitable to hide the defects introduced by the use of high-speed milling: this further leads to increasing the number of smartcards produced by unit of time.

Furthermore, milling is more flexible than other methods such as hot stamping to form various shapes for the recessed portion.

According to a particular embodiment, the milling is performed by a CNC machine (CNC: Computer Numerical Control, a process in which a computer system controls the milling machine using a computer program, typically using G-code).

The use of CNC allows forming a recessed portion having any shape.

According to a particular embodiment, the metal layer comprises a plurality of smartcard regions each including a recessed portion, the method further comprising, after the laminating, separating (typically by cutting) the laminated metal layer into a plurality of smartcards.

In this particular embodiment, all the smartcards include a metal layer with a recessed portion.

A smartcard region is a delimitation of a region having substantially the dimensions of a smartcard. For example, these dimensions may be the ones defined in standard ISO 7816-1 in its 2011 version, for example the ID-1 format.

According to a particular embodiment, the resin layer has a thickness prior to the laminating which is greater than the depth of the recessed portion.

This allows ensuring that the recessed portion is filled and that defects are compensated. The depth may be the maximum depth measured from the surface at the edge of the recessed portion.

According to a particular embodiment, the resin is a polymer resin, for example an epoxy resin, and/or an adhesive.

By way of example, the resin layer may comprise urethane acrylate, silicone acrylate, epoxy acrylate, methacrylate, acrylate, or urethane.

According to a particular embodiment, the resin the resin layer is obtained by dispensing a liquid on surface of the metal layer (the liquid will subsequently solidify) or by assembling a sheet of material above the surface of the metal layer.

According to a particular embodiment, the method comprises forming a cut-out through the metal layer prior to the laminating.

This cut-out may be used if an antenna is used in the smartcard so as to allow a path for the signal, typically if the smartcard is a contact less smartcard.

According to a particular embodiment, the outer layer has a roughness level Ra, above the recessed portion, which is below a roughness level Ra of 4 micrometers, or preferably below a roughness level Ra of 1 micrometer, or even more preferably below a roughness level Ra of 0.5 micrometers.

The portion of the outer layer which is above the recessed portion is the portion of surface of the outer layer which is accessible (the one opposite to the metal layer) and which is a portion that overlaps the recessed portion and its edges. The roughness therefore refers to the surface of the outermost layer. In other words, methods according to the prior art in which a milling is performed after laminating would present a relief in this portion of the outer layer.

According to a particular embodiment, the metal layer comprises another recessed portion on a surface opposite to the surface including the recessed portion, and the metal layer is laminated with the outer layer arranged above the recessed portion, the resin layer arranged between the outer layer and the metal sheet, and another outer layer below the another recessed portion, another resin layer being arranged between the another outer layer, and the metal layer and within the another recessed portion.

This particular embodiment provides a two-sided smartcard having recessed portions on opposite sides of the metal layer. All the above defined-embodiments relating to the smartcard on the side of the surface having the recessed portion apply to the smartcard on the opposite side.

The recessed portion and the another recessed portion may be identical such that the metal layer presents a plane of symmetry passing through the metal layer between the two recessed portions. Alternatively, the recessed portion and the another recessed portion may be different.

The disclosure also provides a smart card comprising a stack of laminated layers comprising: a metal layer having a surface including portion, an outer layer arranged above the recessed portion, and a resin layer arranged between the outer layer and the metal layer and within the recessed portion.

This smartcard may be configured to be manufactured by any one of the above defined embodiment of the method.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the disclosure.

DETAILED DESCRIPTION OF EMBODIMENTS

Methods for manufacturing a smartcard including a metal layer with recessed portions, and the corresponding smartcard are described.

Figure 1A:
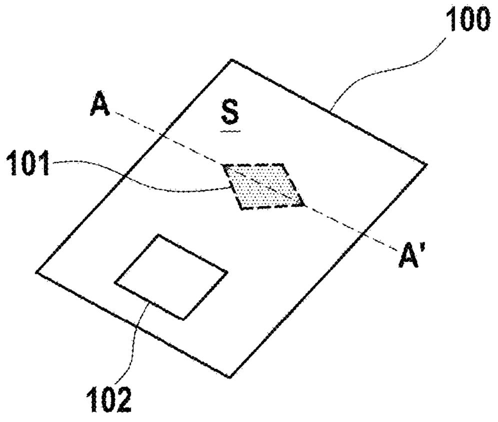
FIG. 1A and FIG. 1B are representations of a metal layer according to an example.
Figure 1B:
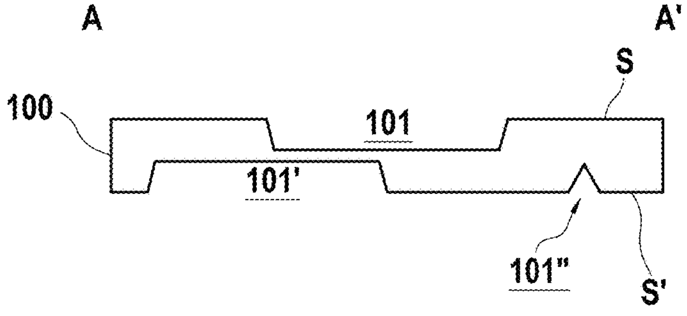

FIG. 1A and FIG. 1B are representations of a metal layer according to an example. FIG. 1A is a shows, schematically, a metal layer 100 comprising a material such as aluminum or steel or any metal. The metal layer has a thickness of the order of a few hundreds of micrometers, for example 330 micrometers.

On the figure, a top surface S of the 100 is visible. In a preliminary step, a recessed portion 101 has been formed from this top surface S. Here, the recessed portion is obtained by milling the top surface S. the disclosure is not limited to milling and other methods to form a recessed portion in a metal layer may be used.

On the figure, the recessed portion has a diamond shape when observed from the top, however, any pattern may be envisaged. If milling is performed with a CNC machine, it is also possible to form a recessed portion defining a pattern which is unique to the smartcard (in other words, a personalized pattern).

A cut-out 102 has also been formed in the metal layer 100. In a manner known in itself, the cut-out allows using an antenna within the smartcard.

FIG. 1B is a cross section of the metal layer 100 in a plane which passes through direction A-A' visible on FIG. 1A, this plane being perpendicular to surface S. As can be seen on the figure, the recessed portion 101 extends in the thickness of the metal layer. By way of example, using CNC milling, it is possible to form recessed portions having a depth comprised between 10 to 300 micrometers.

Also, as shown on the figure, the surface S' opposite to surface S also includes a recessed portion 101' formed in a manner which is analogous to the recessed portion 101. Recessed portions 101 and 101' have a trapezoidal shape when viewed from the side, as shown on FIG. 1B. Other shapes may be considered, for example, surface S' comprises a recess 101" having a V-shape.

Figure 2A:
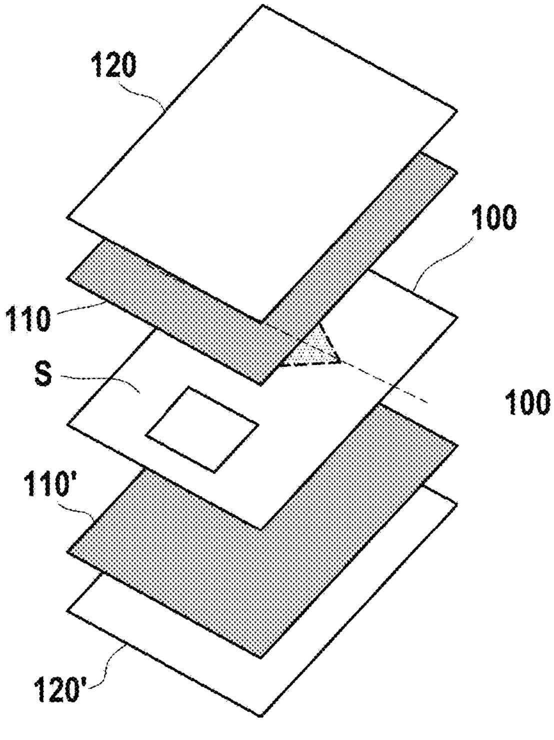
FIG. 2A and FIG. 2B show the stack of layers prior to the laminating.
Figure 2B:
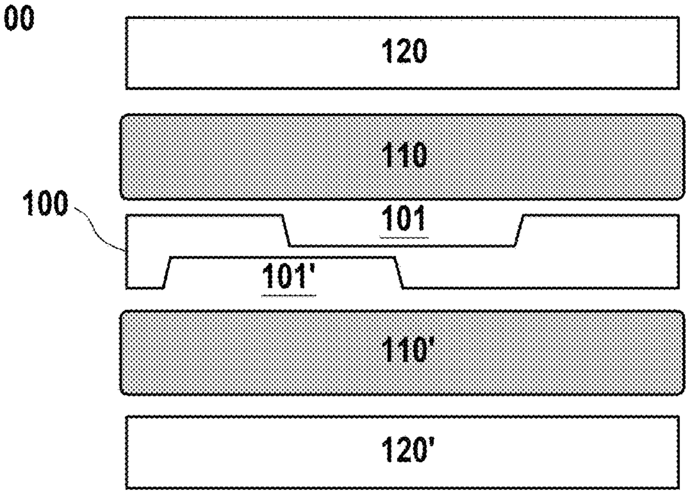

FIG. 2A and FIG. 2B show the stack of layers prior to the laminating. FIG. 2A shows, prior to a laminating step and in an expanded view, the stack of layers that may be laminated together to obtain a smartcard including the milled metal layer 100.

Above surface S, a resin layer 110 is arranged. Here, the resin layer is a sheet of material. Alternatively, it is possible to have a resin layer which is initially liquid and which solidifies later (for example, it is dispersed on the metal layer). The resin layer may be selected so as to fill the recessed portion 101, possibly in a melting step when it is a sheet of material, and preferably so as to compensate the thickness of any defect resulting for example from the milling step (i.e. burrs). Preferably, the resin layer 101 has a thickness of the order of 25 micrometers, which is suitable for example for recessed portions having a depth of the order of 10 micrometers.

By way of example, the resin layer may be a polymer resin, for example an epoxy resin, and/or an adhesive. More precisely, the resin layer may comprise urethane acrylate, silicone acrylate, epoxy acrylate, methacrylate, acrylate, or urethane.

Also, by way of example, the resin layer may initially be in the form of a mesh layer (i.e. a film with holes between the mesh structure), configured to be able to melt to fill the recessed portion, to have the appropriate thickness once melted, and to provide a flat surface.

An outer layer 120 is arranged above the resin layer 101. The outer layer may be a single protective layer. Alternatively, the outer layer 120 comprises a stack of sub layers. For example, if the outer layer 120 comprises a stack of sub layers, it may comprise, (the outside) to bottom: from top a top overlay (for example having a thickness of about 45 micrometers);

a top artwork (for example having a thickness of 127 micrometers), typically printed information;

an epoxy mold compound layer, for example having a thickness of the order of 25 micrometers.

Additional layers may be considered.

On the opposite side and as is more clearly visible on FIG. 2B, another resin layer 110' is arranged below the metal layer 100. The resin layer is analogous to the resin layer 110 and fills the another recessed portion 101'.

Another outer layer 120' is also arranged below the resin layer, in a manner which is analogous to outer layer 120.

Figure 3A:
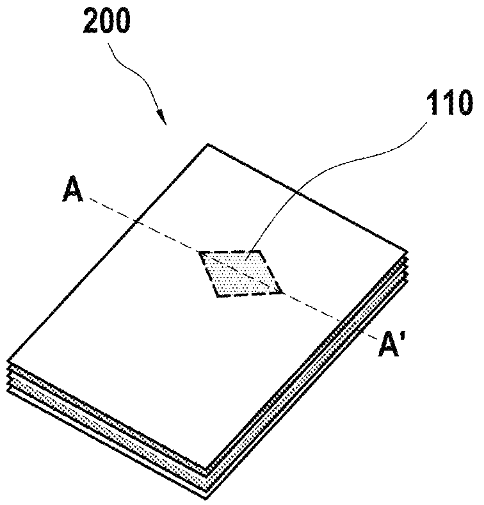
FIG. 3A and FIG. 3B show the stack of layers after the laminating.
Figure 3B:
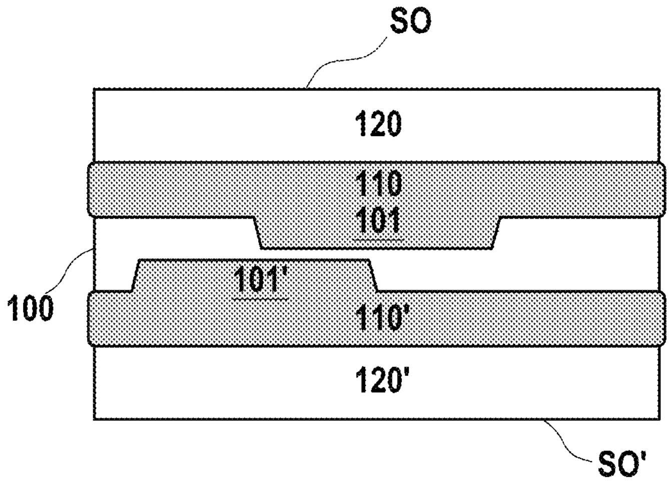

FIGS. 3A and 3B show the result of the laminating step. A smartcard 200 is obtained. This smartcard may have a thickness comprised between 750 to 840 micrometers. As may be observed on the figure, the metal layer is encapsulated in the resin layers (except on the edges: two sides orthogonal to the two surfaces S and S' visible on the figure and two remaining sides not visible on the figure).

The outer layer 120 has an exposed surface SO, above the recessed portion, which appears substantially flat. For example, it has a roughness level of less than 4 micrometers, preferably less than 1 micrometer, and even more preferably less than 0.5 micrometer. This results from the milling step having been performed prior to the laminating and from the use of the resin layer 110. As may be observed on the figure, because of the thickness of the resin layer, the metal layer 100 and the outer layer 120 are fully separated by the resin layer (this is also the case for the metal layer and the another outer layer 120').

The recessed portions may however be observed if the outer layers and the recessed portions are at least partially transparent, which provides an aesthetic effect.

It is possible to use a single metal layer for a plurality of smartcards, wherein the metal layer is divided into a plurality of smartcard regions each including a recessed portion realized by CNC milling.

When a single metal layer is used, resin layers that cover the entire metal layer and outer layers that cover the entire resin layers are used.

Figure 4:
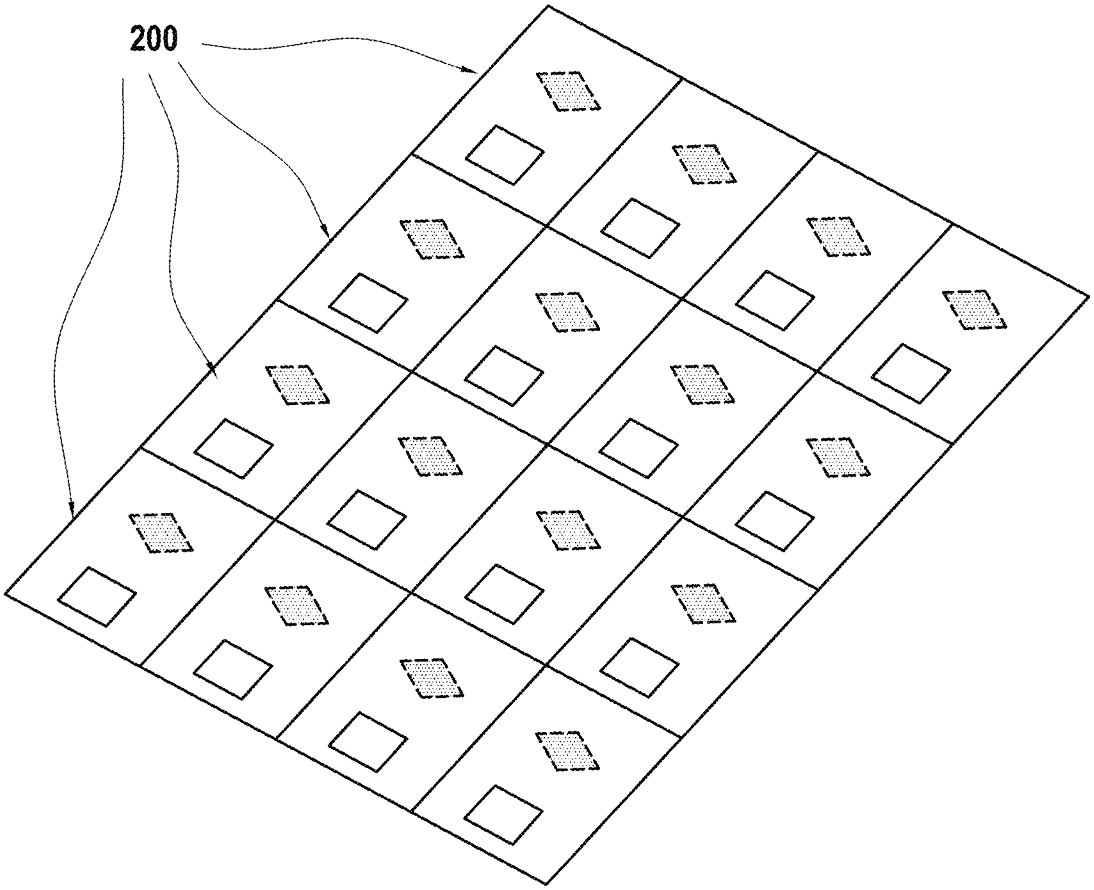
FIG. 4 shows a plurality of smartcards before being separated.

FIG. 4 shows a plurality of smartcards before being separated. After laminating, a structure such as the one visible on FIG. 4 is obtained in which a plurality of smartcards 200 is arranged so as to form a grid.

In a subsequent step, it is possible to separate the smartcards 200 into individual smartcards 200 analogous to the one shown on FIGS. 3A and 3B.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

The invention claimed is:

1. A method of manufacturing a smartcard comprising a metal layer, the method comprising:

providing a metal layer having a first surface including a first recessed portion;

wherein the metal layer comprises a second recessed portion on a second surface opposite to the first surface including the first recessed portion;

laminating the metal layer with a first outer layer arranged above the first recessed portion and a first resin layer arranged between the first outer layer and the metal layer and within the first recessed portion;

laminating the metal layer with a second outer layer below the second recessed portion, a second resin layer being arranged between the second outer layer and the metal layer and within the second recessed portion; and separating the laminated metal layer into a plurality of smartcards;

wherein the metal layer comprises a plurality of smartcard regions each including said first and second recessed portions;

thereby to produce a two-sided smartcard having first and second recessed portions on respective opposite sides of the metal layer; and wherein the first and second outer layers and the first and second recessed portions are at least partially transparent.

2. The method of claim 1, comprising a step of milling an initial metal layer so as to obtain the metal layer including the first and second recessed portions formed by milling.

3. The method of claim 2, wherein the milling is performed by a CNC machine.

4. The method of claim 1, wherein the first and second resin layers each have a thickness prior to the laminating which is greater than a depth of the first and second recessed portions, respectively.

5. The method of claim 1, wherein the first and second resin layers are formed of a polymer resin.

6. The method of claim 5, wherein the polymer resin is an epoxy resin.

7. The method of claim 5, wherein the polymer resin is an adhesive.

8. The method of claim 1, wherein the first and second resin layers are obtained by dispensing a liquid on surface the first and second surfaces of the metal layer.

9. The method of claim 1, wherein the first and second resin layers are obtained by assembling first and second sheets of material above and below the first and second surfaces of the metal layer, respectively.

10. The method of claim 1, wherein the first and second outer layers each has a roughness level Ra, above the first and second recessed portions, which is below a roughness level Ra of 4 micrometers.

11. The method of claim 10, wherein the roughness level Ra is below a roughness level Ra of 1 micrometer.

12. The method of claim 11, wherein the roughness level Ra is below 0.5 micrometers.

* * * * *